United States Patent [19]

Orazietti

[11] Patent Number: 4,725,840
[45] Date of Patent: Feb. 16, 1988

[54] USER CARRIED RADAR DETECTOR

[76] Inventor: Vincent A. Orazietti, 1206 Elmhurst St., Bensenville, Ill. 60106

[21] Appl. No.: 917,967

[22] Filed: Oct. 14, 1986

[51] Int. Cl.$^4$ ............................................. G01S 7/40
[52] U.S. Cl. .................................................... 342/20
[58] Field of Search ........................................ 342/20

[56] References Cited

U.S. PATENT DOCUMENTS

| | | | |
|---|---|---|---|
| 3,550,008 | 12/1970 | Bright | 342/20 X |
| 4,181,910 | 1/1980 | Hitterdal | 342/20 |
| 4,318,103 | 3/1982 | Roettele et al. | 342/20 |

OTHER PUBLICATIONS

"Scanlock Mark VB" advertisement.
"Little Marvel" advertisement.
"What Makes This Radar Detector So Desirable That . . ." advertisement for ESCORT Radar Warning Receiver-Cincinnati Microwave.
"Introducing the Best Radar Detector on the Road . . ." advertisement for WHISTLER Speed Radar Detec.-Controlonics Corp.
"Small Wonder, At Last, Pocket-Size Radar Protection", advertisement for PASSPORT Radar, Cin. Mic., 10/86, Private Clubs, p. 13.
"Road Patrol XK Radar Detectors", catalog page from Radio Shack Catalog, p. 69.
"Triple Protection Against Police Radar-at One Half the Size . . ." advertisement for GUL Radar Detector.
"Small Wonder, It's Here, Pocket-Size Radar Protection." advertisement for PASSPORT-Cincin. Mic., Playboy, p. 187.
"One of the Few Road Machines that Performs as Well as Ours." advertisement for Whistler SPECTRUM 2 Radar Detector.
"The Technology Behind our New Radar Detector Came Out of . . ." Ad for ROAD ALERT Radar-Sparkomatic Corp., Playboy, p. 36.
"The Micro Eye Vector New Radar Detection Technology" advertisement for MICRO EYE VECTOR Radar-BEL-Tronics Ltd, Playboy, p. 182.
"A $10,000 Challenge to Escort", advertisement for MAXON RD-1 Radar Detector-DAK Industries, Inc., Playboy, p. 9.
"Can You Find the Radar in This Picture? Cobra Can." advertisement for TRAPSHOOTER and PRO II Radars-Cobra Dynascan Corp.

Primary Examiner—Thomas H. Tarcza
Assistant Examiner—John B. Sotomayor
Attorney, Agent, or Firm—Hill, Van Santen, Steadman & Simpson

[57] ABSTRACT

A superheterodyne radar detector includes a compact watertight and durable housing to which a variety of clips and fastening means may be attached. Batteries are provided for powering the radar sensing circuitry, as well as means for recharging and/or replacing batteries. Two antenna horns are mounted within the housing directed perpendicularly with respect to one another and a shield is provided for mounting over one of the two antenna horns. A sensed radar signal is indicated by an earphone and/or an indicator light and/or a speaker.

1 Claim, 4 Drawing Figures

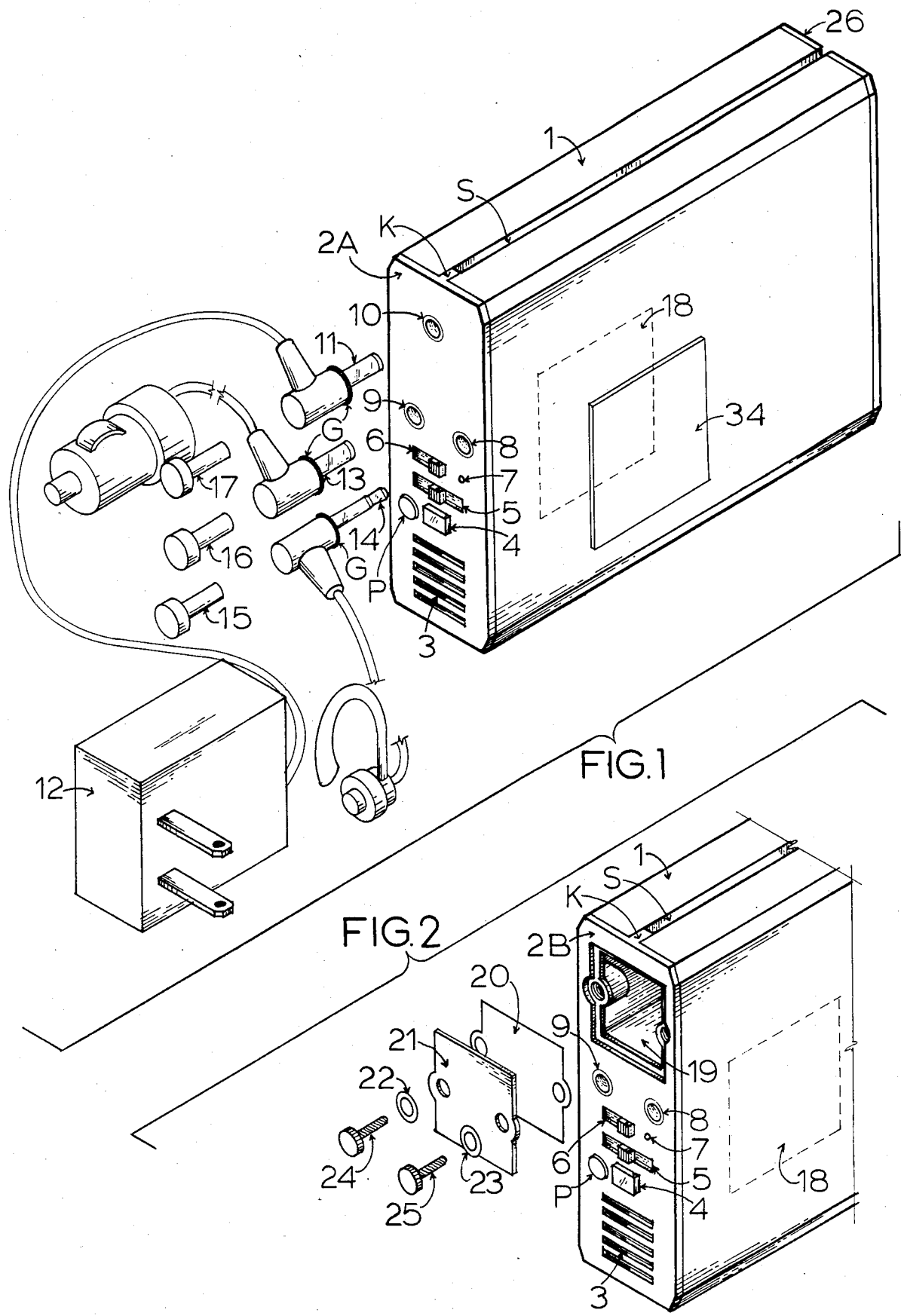

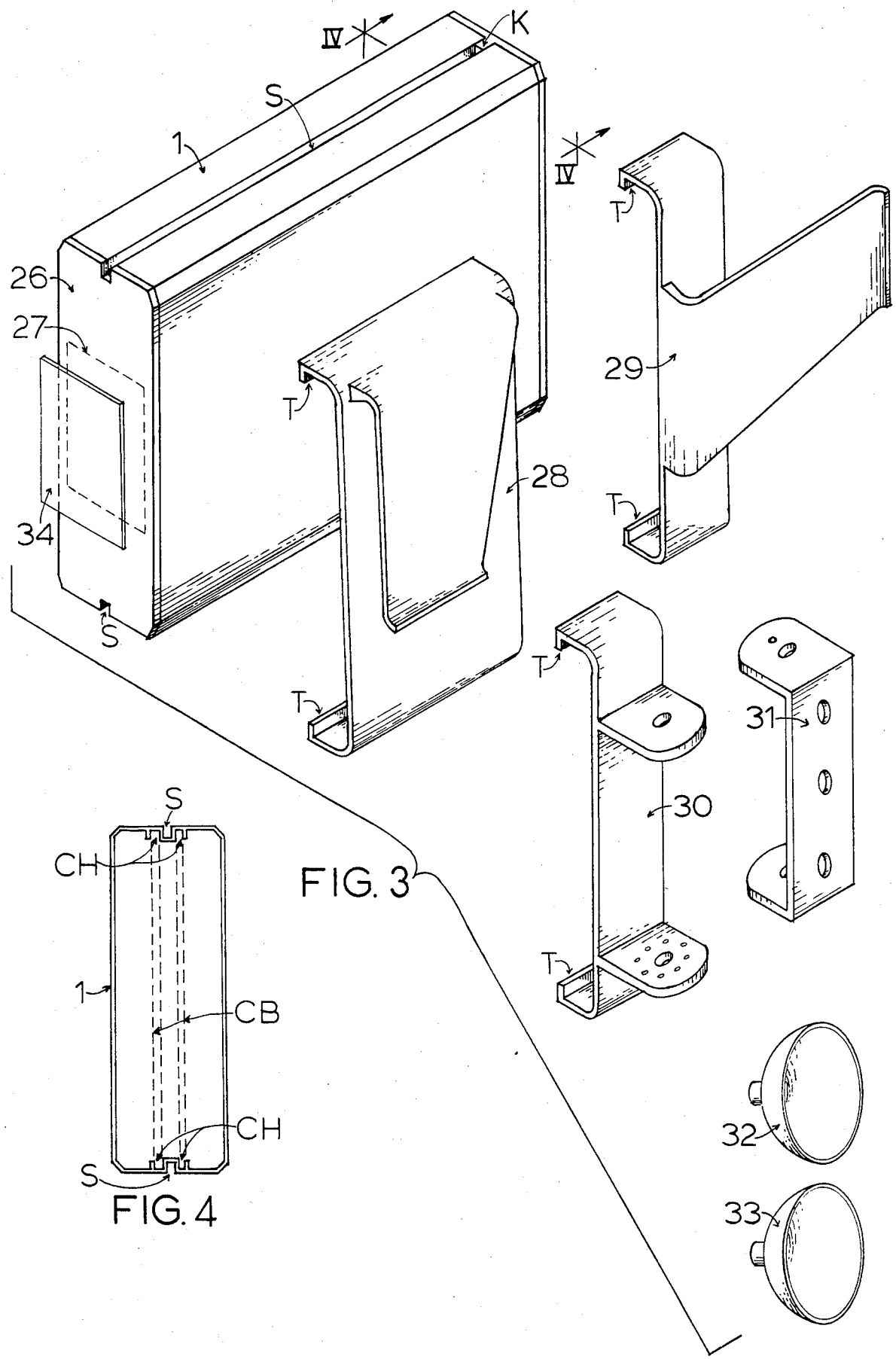

USER CARRIED RADAR DETECTOR

BACKGROUND OF THE INVENTION

1. Field of the Invention

The present invention relates generally to a superheterodyne radar detector.

2. Description of the Prior Art

Radar detecting superheterodyne units are known for use in a vehicle to detect the presence of radar signals in the X-band and in the K-band which are generated by law enforcement radar units for speed detection. Many of the known radar detecting units are compact and can either be permanently mounted in a vehicle or removably mounted. In any case, the known radar detecting units draw power from the vehicle power supply. Each of the known units is monodirectional, the antenna having a single signal detecting direction. Also, detection of a radar signal by the known devices is indicated by a sound emitted from a speaker and by the illumination of a plurality of lights on the unit. Recent improvements in microelectronic circuitry have enabled many of the known radar detectors to undergo a considerable size reduction, often with a corresponding lowering of the energy consumed by the circuitry.

SUMMARY OF THE PRESENT INVENTION

The present invention provides a compact radar detecting device with a self-contained power source to enable the user, such as the rider of a motorcycle, to wear the device without a connection to the vehicle power source. The device has a radar sensing horn, or radar focusing device, oriented in a forward direction when the user is wearing the device. For instance, the sensor is oriented laterally for detecting radar signals when placed in a shirt pocket. In one embodiment, two sensing horns or radar focusing devices are provided oriented perpendicular to each other with means for interrupting the sensing capability from a selected one of the two horns. Thus, the device can be used in either of two orientations.

Another development of the present invention is to provide a warning indicator that is easily sensed while riding a motorcycle. Thus, an earphone audio indicator capable of being worn beneath a helmet is provided in place of or in addition to the indicator lights and the speaker commonly used in the prior art devices. By eliminating a number of the indicator lights and instead using only a single light, the device utilizes less current in the warning state so that the life of the power supply, which is preferably a battery power supply, is extended. Furthermore, the use of low current drain components throughout the device significantly extends the power supply life.

The housing of the present device is watertight to prevent damage from inclement weather. Although plug openings are included in the housing for the earphone and for an external power supply, if desired, the plug openings include means for sealing out moisture from the housing. Various clips and brackets are mountable to the housing for fastening the device either to an article of the user's clothing or to a vehicle.

BRIEF DESCRIPTION OF THE DRAWINGS

FIG. 1 is an isometric perspective view of a rechargeable battery radar detecting unit according to the principles of the present invention and including a plurality of attachments for connection to the device;

FIG. 2 is a partial isometric perspective view of a second embodiment of the present radar detector showing a battery compartment opening;

FIG. 3 is an isometric perspective view from the rear with respect to FIG. 1 of the present radar detector, including a plurality of clips and brackets for attachment to the device; and FIG. 4 is a cross section along line d-d showing the housing outline for the present device.

DESCRIPTION OF THE PREFERRED EMBODIMENTS

In FIG. 1, a superheterodyne radar detector housing is shown at 1, within which is included radar signal sensing circuitry (not shown). The radar sensing circuitry is highly compact and miniaturized so that the external dimensions of the housing 1 are small enough to fit in a standard size shirt pocket with basic dimensions of 1"×3"×4", although other dimensions can be used. The contours of the housing 1 are such that it is easily inserted into and removed from a pocket. More particularly, corners of the housing 1 are cut at an angle or slightly rounded. The housing 1 is preferably formed of a high impact plastic or other suitable material which withstands rough treatment. The parts of which the housing 1 is formed may be injection molded or extruded.

A face plate 2A is mounted at the end of the housing 1 and sealed thereto to prevent water from seeping into the interior of the housing 1. The face plate 2A preferably has an inner lip (not shown) which aligns the plate 2A with the housing 1 and provides a surface for bonding between the housing 1 and plate 2A. In the face plate 2A is included a speaker or buzzer 3 for audibly indicating the presence of a detected radar signal, also referred to as a detection event. A plurality of slots are formed in the face plate 2A through which sound is emitted from the speaker or buzzer 3. The speaker or buzzer 3 is affixed to the interior surface of the face plate 2A in watertight fashion. Not only does the present device emit an audible signal through the speaker 3 when a radar signal is detected, but a visual indication is also provided by a warning light 4, also mounted in the end face 2A. The warning light 4 is preferably a bright, low drain LED which is illuminated when a radar signal is detected.

A multi-position switch 5 to switch on the radar detection circuitry and preferably to vary the volume of the signal emitted from the speaker 3 is included in the face plate 2A. In the illustrated embodiment, the switch 5 has an off position, an on-low volume position, and an on-high volume position. A second switch 6 is also included to vary the sensitivity of the detection circuitry, the switch 6 having a highway, or high sensitivity, position and a city, or low sensitivity, position. The city position is useful to eliminate interference signals such as reflected signals from buildings and the like. Both the switch 5 and the switch 6 are watertight. A small indicator lamp 7 is, for example, a low drain LED and indicates that the power to the unit is on.

Three jacks 8, 9, and 10 are mounted in the end face 2A in watertight arrangement. The jacks 8, 9, and 10 are self-enclosed so that should water get into the jack openings, it does not seep into the interior of the housing 1. A plug 11 fits into the jack 10 and is connected to a recharging unit 12 which in turn is connectable to AC power. The recharging unit 12, when connected through the jack 10, supplies recharging current to permanent, rechargeable batteries (not shown) contained within the housing 1.

A second plug 13, connectable in the jack 9, is provided for connection of the radar detection unit to a vehicle power system, such as through a cigarette lighter receptacle. Other means of connecting the present device to a vehicle power supply are also contemplated. Thus, if the user so desires, the present radar detector can be operated either from the rechargeable batteries contained therewithin or from a vehicle power supply.

To facilitate the use of the present radar detector by the rider of a motorcycle, the jack 8 receives a plug 14 which is connected to an earphone. When the plug 14 is fitted into the jack 8, the speaker 3 is disconnected, thereby reducing current drain on the batteries. The indicator light 4 may also be automatically disconnected by connecting the earphone plug 14. Although an in-the-ear type earphone is shown, various other earphones are also contemplated for use with the present invention including an earphone that hooks over the back of the ear or an earphone mounted in a headband. For the convenience of a motorcycle rider, the earphone is compact enough to be worn within a helmet.

Since the present radar detector unit may be exposed to the elements while in the pocket of a motorcycle rider, it is important that the unit be completely watertight. As such, rubber plugs 15, 16, and 17 are provided to fit into unused ones of the jacks 8, 9, and 10. The dummy plugs 15, 16, and 17 are formed of a relatively easily deformable rubber or plastic material so that they seal the jacks 8, 9, and 10 when inserted therein. The plugs 11, 13, and 14 make a watertight seal with their respective jacks 10, 9, and 8 when therein by the provision of a thin gasket G extending around the shaft of each plug 11, 13, and 14.

Each of the disclosed features are not required in a single embodiment of the present radar detector. For instance, if the unit is to be used exclusively with an earphone, the speaker 3 is not required. Furthermore, additional features may be provided in the unit. For instance, a photocell P can be mounted on the housing 1 to sense the light level, the photocell P being connected to vary the brightness of the warning light 4 depending on the ambient light level. An advantage of such photosensitive light dimmer is that the brightness and, correspondingly, the current drain of the indicator light 4 would be reduced when the unit is being used within a pocket.

In FIG. 1, the radar signal detection circuitry includes an antenna cone 18 shown in dotted outline and directed to a lateral wall of the housing 1. The antenna 18 is used to sense incoming radar signals and is disposed to receive radar signals when the unit is in the user's shirt pocket.

Referring to FIG. 2, the permanent rechargeable batteries of FIG. 1 are replaced with non-rechargeable batteries, in which case, a face plate 2B is provided having an opening for a battery compartment 19. To insure a watertight seal over the battery compartment 19, a gasket 20, such as of rubber, is disposed below a door 21 which is held in place by screws 24 and 25 that include gaskets 22 and 23. The gaskets 22 and 23 are of a thin vinyl material to seal the heads of the screws 24 and 25 against the door 21. The screws 24 and 25 preferably have gnarled edges so that they can be removed and reinserted with the fingers.

In FIG. 3, the back of the radar detector housing 1 is shown including an end plate 26 behind which is disposed an antenna focusing device 27 directed out the end of the housing 1 so that the device can be used in a horizontal orientation. The antenna focusing device 27, in one embodiment, is in addition to the antenna focusing device 18 shown in FIG. 1 and 2. Thus, the radar detector in one embodiment is sensitive to radar signals in two directions and can be used either in a vertical or a horizontal orientation.

To make an accurate reading of the incoming radar signal, one of the two antenna focusing devices 18 and 27 is shielded by a shield member 34 which is affixable to the surface of the housing 1 either over the antenna focusing device 27 or alternately over the antenna focusing device 18. In one embodiment, the shield member 34 is of a metallic foil and is removably fastenable, for example, by a Velcro brand fastening means.

The antenna focusing devices 18 and 27 are radar signal focusing devices, may be of injection molded plastic and covered with a metallic material, such as flash plated chrome.

Due to the highly portable nature of the present radar detector, the device 1 can simply be slipped into a shirt or jacket pocket for use. A variety of clips and fastening brackets may be affixed to the housing 1 to more securely hold the device in place either during use or during storage. One such clip 28 includes a fastening tang extending to the side so that the radar detector can be clipped onto a belt or the like. A second clip 29 includes a tang extending lengthwise of the device with a slight inward bow to provide pressure on the body 1 of the detector. The clip 29 can thus be used on the sun visor of an automobile or, for instance, in a shirt pocket or clipped to a cable of a motorcycle. The clips 28 and 29 are removable so that the unit fits comfortably in a pocket.

Both of the clips 28 and 29 have a generally U-shaped base with respectively inwardly projecting tabs T that fit into a pair of slots S at opposite sides of the housing 1. As can be seen in FIG. 4, the slots S are substantially in the middle of the short sides of the housing 1. The clips 28 and 29 are slidably affixed to the housing 1 by sliding the tabs T into respective ones of the slots S and, thus, can be removed and interchanged. The end plates 2A and 2B include a pair of keys K which extend into the slots S a short distance and prevent the tabs T from sliding out the end of the slots S.

If a more permanent mounting of the device 1 is desired, a two-piece bracket 30 and 31 may be used with a base portion 30 being slidably affixed to the housing 1 in the slots S and the clevis member 31 being pivotally affixed to the base 30, such as by bolts (not shown). A small bump is provided on the clevis 31 with a plurality of like-shaped depressions provided on the base 30 so that detents are formed to hold the radar detector in any of a plurality of angularly related positions.

A further improvement is to provide suction cups 32 and 33 affixed to the clevis member 31 so that the present device is mountable to the smooth surface of a dashboard or a windshield of a vehicle.

As seen in FIG. 4, the housing 1 includes not only the slots S but also a pair of internal channels CH formed therewithin for receiving circuit boards CB on which are mounted the radar sensing circuitry. The circuit boards CB (shown in dotted outline) are thereby securely mounted within the housing 1 to withstand rough handling.

The device is watertight by the provision of seals and coacting lips (not shown) between the end faces 2A or 2B and 26, and the housing 1, as well as by the provision of dummy plugs 15, 16, and 17 for insertion into the jacks 8, 9, and 10. Since the device is to be battery powered, low current drain components such as CMOS circuitry, thick film elements, galium arsenite diodes, and low drain LED lights are used throughout. For instance, the use of a CMOS microprocessor in place of a standard microprocessor can reduce current drain by 25%. Furthermore, since the known radar detectors use between 200 and 250 milliamps when in a warning state, primarily for illuminating a bank of lights, the provision of a single warning light 4 which may be switched off in favor of an earphone or switched to a low drain state further reduces drain on the batteries.

Although the present device is disclosed as for use by the rider of a motorcycle, it is intended that the various features disclosed herein enable the device to be used in any vehicle.

Thus, the present invention provides a compact, user carriable radar detector having a bidirectional antenna system adapted particularly for use by a motorcycle rider. The present device may also be used in an automobile or other vehicle as well. The housing of the present device is formed in watertight fashion including the use of watertight switches, jacks, speakers, and doors and is preferably formed of a high impact material for durability.

Although modifications and changes may be suggested by those skilled in the art, it is the intention of the inventor to embody within the patent warranted hereon all changes and modifications as reasonably and properly come within the scope of his contribution to the art.

I claim as my invention:

1. A bidirectional radar detector for sensing the presence of radar signals, comprising:
   a compact housing defining slots along opposing housing sides, said housing being watertight;
   a superheterodyne radar sensing circuit mounted within said compact housing and having first and second inputs and an output providing an output signal upon a radar signal being sensed;
   a battery power supply mounted within said compact housing and connected to power said radar sensing circuit;
   first and second directional signal focusing antennas mounted within said housing, said first directional signal focusing antenna being mounted to focus and sense radar signals from a first direction and said second directional signal focusing antenna being mounted to focus and sense radar signals from a second direction substantially perpendicular to said first direction to enable said radar detector to sense radar signals when mounted in either of two positions, said first and second signal focusing antennas being connected to respective ones of said first and second inputs of said superheterodyne radar sensing circuit to transmit focussed and sensed radar signals to said sensing circuit;
   a radar signal shield of metal foil removably fastenable over alternate ones of said first and second signal focusing antennas to block stray radar signals from a selected one of said first and second signal focusing antennas;
   an earphone connectable to said output of said superheterodyne radar sensing circuit to produce an audible signal upon receipt of said output signal from radar sensing circuit;
   a first jack in said housing connected to said output of said superheterodyne radar sensing circuit;
   a first plug connected to said earphone and selectivity connectable in said first jack to transmit said output signal to said earphone;
   a deformable dummy plug of water resistant material selectivity connectable in said first jack to provide a watertight seal when said first plug is not in said first jack;
   a speaker mounted within said housing and connected to said output of said superheterodyne radar sensing circuit to produce an audible signal upon receiving an output signal;
   means for inhibiting the operation of said speaker when said first plug is connected in said first jack;
   an indicator lamp in said housing and connected to said output of said radar sensing circuit to provide a visual indication upon receipt of said output signal;
   means for selectivity fastening said housing in place including:
      a base disposed adjacent said housing and spanning between said opposing housing sides;
      a pair of tabs extending toward one another from said base and being slidably received in said slots in said opposing housing sides to permit said base to slidably move along said housing; and
      a fastening member extending from said base for selective engagement;
   means for connecting said superheterodyne radar sensing circuit to an external power supply including:
      a third jack in said housing connected to said superheterodyne radar sensing circuit;
      a third plug connectable to the external power supply and selectivity connectable in said third jack to transmit power from said external power supply to said sensing circuit;
      a second deformable dummy plug of water resistant material selectivity connectable in said third jack to provide a water tight seal when said third plug is not in said third jack; and
   means for inhibiting the provision of battery power from said battery power supply to said sensing circuit when said sensing circuit receives external power through said third jack from the external power supply.

* * * * *